United States Patent [19]

Bertz et al.

[11] Patent Number: 4,610,091
[45] Date of Patent: Sep. 9, 1986

[54] AUTOMATIC GEAR TESTING APPARATUS

[75] Inventors: Hans-Ulrich Bertz, Rastatt; Peter Golder, Ettlingen, both of Fed. Rep. of Germany

[73] Assignee: Willy Hofler, Karlsruhe, Fed. Rep. of Germany

[21] Appl. No.: 804,336

[22] Filed: Dec. 5, 1985

Related U.S. Application Data

[63] Continuation of Ser. No. 609,070, May 10, 1984, abandoned.

[30] Foreign Application Priority Data

May 11, 1983 [DE] Fed. Rep. of Germany ....... 3317249

[51] Int. Cl.$^4$ ............................................. G01M 13/02
[52] U.S. Cl. .................................. 33/179.5 R; 33/556; 73/162
[58] Field of Search ............. 33/179.5, 169 R, 172 E, 33/556, 558, 559, 560, 561; 73/162

[56] References Cited

U.S. PATENT DOCUMENTS

| | | | |
|---|---|---|---|
| 2,992,491 | 7/1961 | Hofler | 33/179.5 R |
| 3,800,423 | 4/1974 | Munro et al. | 33/179.5 R |
| 3,936,946 | 2/1976 | Ruffner et al. | 33/179.5 R |
| 3,945,124 | 3/1976 | Jacoby et al. | 33/174 L |
| 4,228,591 | 10/1980 | Sterki et al. | 33/174 R |
| 4,297,788 | 11/1981 | Sterki et al. | 33/179.5 R |
| 4,519,241 | 5/1985 | Hofler | 73/162 |
| 4,519,242 | 5/1985 | Hofler et al. | 73/162 |

Primary Examiner—Charles Frankfort
Assistant Examiner—Patrick R. Scanlon
Attorney, Agent, or Firm—Edwin E. Greigg

[57] ABSTRACT

An automatic test apparatus for testing circumferential spacing in gears, as well as a further development for testing deviations in tooth thickness, tooth gaps, and gear concentricity, are disclosed, in which with a single revolution of the gear the testing of circumferential spacing is accomplished for both the right and left flanks of the wheel. The values for the deviations in gear concentricity, tooth thickness and tooth gaps are preferably detected at the same time, thereby avoiding the possibility that the measuring feeler can undergo vibration-caused deviations with respect to the tooth flank to be approached for attaining a particular measuring position.

4 Claims, 12 Drawing Figures

AUTOMATIC GEAR TESTING APPARATUS

This is a continuation of copending application Ser. No. 609,070 filed May 10, 1984 now abandoned.

BACKGROUND OF THE INVENTION

The invention relates to an automatic testing apparatus for testing the circumferential spacing and for ascertaining deviations in concentricity, tooth thickness and tooth gap in gears. In this apparatus, the gear is indexable from one measuring position to another by means of its own power source or, as needed, is caused to rotate via a slip coupling, and on the apparatus frame a primary slide is displaceable by a drive mechanism substantially radially toward and away from the gear between optionally adjustable stops. The positioning of the gear for the measuring processes is effected by means of an incremental rotational drive means rotationally connected with the gear. A feeler for the successive ascertainment of measured values on the right and left tooth flanks is also disposable in one measurement increment on the primary slide. Means advancing from one tooth gap to the next and intended for automatically inserting the feeler into the measurement position and retracting it back out of this position are also included, as are means for controlling the pickup, emission and further processing of the measured values in a manner that is coordinated therewith.

U.S. Ser. No. 477,785 addresses the disadvantage of a known apparatus, which is that two complete gear revolutions are required in order to ascertain the error in circumferential spacing; moreover, to accomplish this, the measuring feeler must be transferred from one tooth flank to the other between the two revolutions. Solutions are proposed in the above-identified application for accomplishing in a single gear revolution the testing of circumferential spacing of both the right and the left flanks of the gear, thereby reducing the testing time by half as compared with then-known apparatus. A method is also described which makes it possible, with this new circumferential spacing test apparatus, to measure deviations in gear concentricity, tooth thickness and tooth gaps as well, thereby obviating the use of a second apparatus therefor. Among other features, the method includes one in which a measuring feeler, located in one measuring position in a tooth gap, is indexable from the left to the right tooth flank or vice versa.

This indexing action can result in recoiling with respect to the measuring feeler, which may possibly interfere with the pickup of the measured value.

OBJECT AND SUMMARY OF THE INVENTION

It is accordingly an object of the present invention to disclose a construction with which such recoiling can be avoided.

This object is attained, based on a test apparatus of the generic type described above, in that the measuring feeler is guided parallel to itself with the aid of a parallelogram spring arrangement; that for the measuring position of one measuring step at a given time, the feeler is transferred by the gear into a deflected position (to the right or the left) from the neutral position of its spring arrangement under the influence of spring prestressing; and that the positioning for emitting a measured value with respect to the right and left flanks of one tooth gap is effected by the rotational drive means.

By so embodying the test apparatus according to the invention, it is possible to bring the measuring feeler into the measuring position on the pitch circle of the gear while it is resting on one flank and thus while the spring arrangement is deflected with this bias, and then, either with a continuously revolving gear or an incrementally positioned gear, with the aid of the rotational drive means, to cause the measured value emission to take place at a position previously determined by means of a zero balance. Afterward, the gear continues to revolve or is positioned at a further increment, as the case may be, until the measuring feeler attains the other tooth flank of the tooth gap at which the measuring feeler has just arrived. Upon passing through the zero position established at the rotational drive means, the pickup of the measured value then takes place at the other tooth flank.

This apparatus has the effect that the measuring feeler, prior to the actual emission of a measured value, is located in a state of resilient contact against the flank which has just been scanned, so that instantaneous recoiling phenomena cannot occur; quite the contrary, a smooth mutual contact is established between the tooth flank and the measuring feeler, as a result of which the speed of measurement—that is, the passage through the individual measuring positions—can be kept at a remarkably high level, without the danger that apparatus-caused measuring errors will occur.

The apparatus according to the invention is also suitable for performing the method described in U.S. Ser. No. 477,785 for ascertaining deviations in concentricity, tooth thickness and tooth gaps, in that with appropriate processing in a computer connected with the measuring feeler, the measurement values ascertained are processed further in the manner described in the above-identified application. It is important in this respect that the spacing deviation on each side of the tooth gap or tooth is detected in the vicinity of the pitch circle and that with the aid of a computer, the deviations resulting in the circumferential direction of the tooth are added to the two measured values pertaining to the tooth gap or tooth, then divided by the tangent of the feeler positioning angle and finally divided in half before the emission of the measured value takes place; as a result, a measured value deviation deriving from an excess in size of the tooth gap or tooth is processed further in the form of a positive value in determining deviations in the tooth gap, concentricity or tooth thickness.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
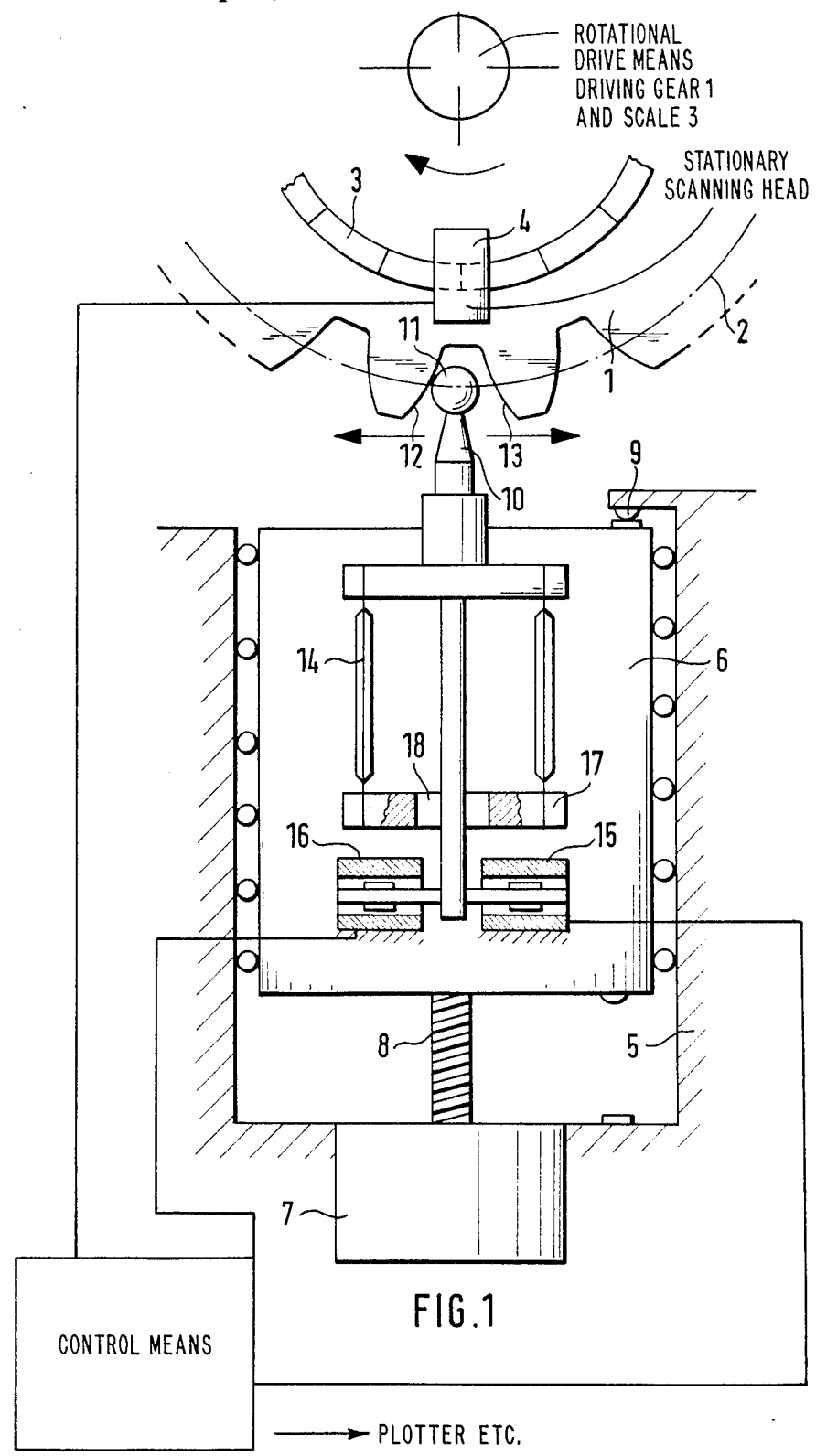
FIG. 1 is a schematic plan view of a test apparatus according to the invention.

According to FIG. 1, a gear 1 having a pitch circle 2 is shown, the gear being connected to an incremental rotational drive means comprising a scale 3 and a scanning head 4. Thus, the gear wheel is driven to revolve continuously by a motor. Joined to the gear wheel is the scale 3 of the rotational drive means; that is, the scale 3 also revolves continuously. The scanning head 4 of the rotational drive means is stationary and as the scale 3 revolves it "feels" the pulses provided by the markings on the scale. The number of markings and size of the teeth of the gear wheel are also known. Also shown is a control means for automatic insertion and retraction of feeler 11 into the tooth gaps and back out of the tooth gaps. Furthermore, with respect to the known embodiment of the gear wheel, it is possible to specify when the measured value for the left and right tooth flanks must be emitted, This actual measured value deviates from the zero position ascertained in accordance with FIGS. 2–4 whenever the gear wheel has an error, or if the gear wheel has no error it is equal to zero. The result thus ascertained is recorded, for example, by a printer.

Naturally, the arrangement can also be vice versa, that is, with the scanning head 4 revolving with the gear wheel and the scale 3 stationary. The measuring apparatus, which is not shown in detail in terms of its physical structure, has a primary slide 6 which is radially displaceable on the apparatus housing 5 with respect to the gear 1. This primary slide 6 is movable toward and away from the gear by means of a drive mechanism comprising a motor 7 and spindle 8, its position in the direction toward the gear being determined by a stop 9 integral with the housing and toward which stop 9 the primary slide 6 moves.

In the position of the slide 6 oriented toward the gear 1, the measuring feeler 10 is located with its scanning ball 11 on the pitch circle 2, resting on the particular tooth flank 12 or 13.

The measuring feeler 10 is supported in a parallelogram spring arrangement 14, which assures that upon deflectional movements the measuring feeler will move at a tangent to the gear 1. The measuring feeler 10 is connected at the back with two inductive transducers 15 and 16, while the rearward fastening 17 of the spring arrangement 14 is firmly connected to the slide 6 and has an opening 18 for connecting the measuring feeler with the inductive transducers. Naturally the inductive transducers 15, 16 may instead be replaced by an incremental scale or the like.

Figure 2:
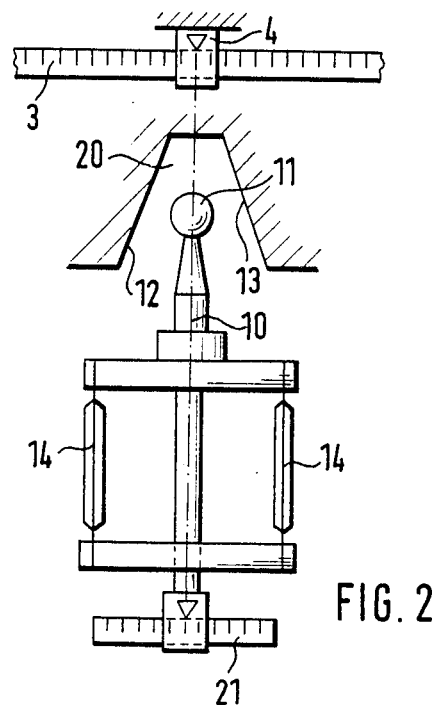
FIG. 2 shows a neutral position of the measuring apparatus according to FIG. 1.
Figure 3:
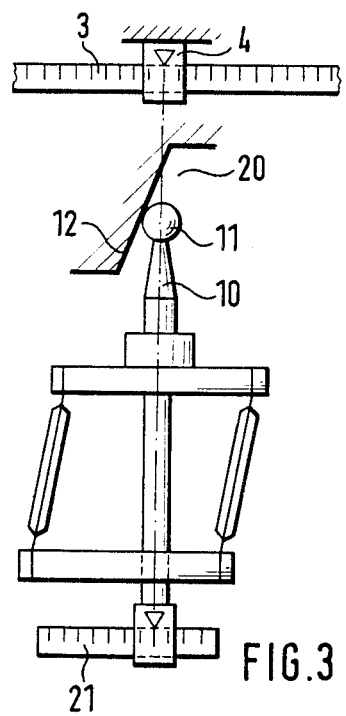
FIG. 3 shows one stage in the calibration of the measuring apparatus according to FIG. 1.
Figure 4:
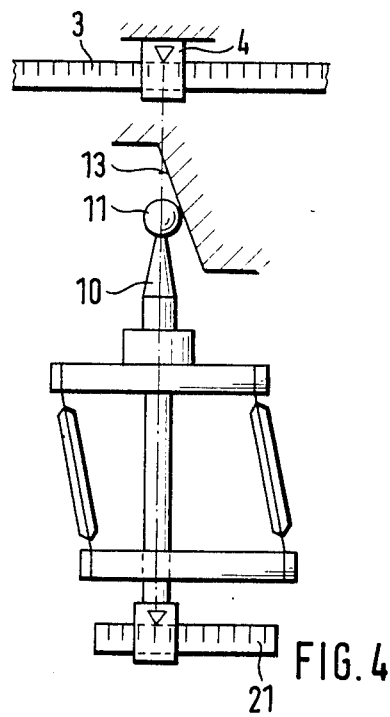
FIG. 4 shows yet another stage in the calibration of the measuring apparatus according to FIG. 1.

FIGS. 2–4 show how the zero balancing of the test apparatus is accomplished.

According to FIG. 2, the measuring feeler 10, 11 is located in a neutral position in a tooth gap 20 between two tooth flanks 12 and 13. The parallelogram spring arrangement 14 is relaxed, and the emission means for a measured value, which here is shown in the form of an incremental travel transducer, is located in a zero position. The rotational drive means 3, 4 is likewise located in a neutral position.

From the standpoint of measuring technology there is not a necessary connection between the rotational drive means and the measured value emission means. The rotational drive means makes it possible to cause the gear wheel to be driven to revolve continuously, and the scanning head 4 determines at a given time the instant at which the measured value just obtained by the feeler 11 is emitted. The gear wheel, as mentioned earlier, can also be positioned incrementally by the rotational drive means. This approximately corresponds to the situation in which with the aid of the drive motor, controlled by the rotational drive means, the gear wheel is incrementally moved in rotation in accordance with the markings on the scale 3; however, even if divided up into small steps, this too corresponds to a continuous rotational movement. Regardless of the either uninterruptedly continuous or incrementally continuous rotational movement of the gear wheel, the scanning head 4, on the basis of the scale markings for the circular spacing 3, still determines when the measured values should be emitted. This means that the emission of measured values is dependent on the angular position of the gear wheel, regardless of how the gear wheel is set to rotating. Thus, in principle the course of the measurement process is independent of the rotational speed of the gear wheel; that is, the course of measurement runs independently of whether the gear wheel is rotated somewhat faster or somewhat slower.

The means for further processing of the measured value are a printer, as previously stated, or, for instance, a digital display, with the aid of which the measured values ascertained are rendered visible or written down.

Now, as shown in FIG. 3, the feeler 10, 11 is placed against the left flank 12 of the gap 20, and at the rotational drive means 3, 4 the setting "measured value left flank" is performed, while at the measured value emission means 21 the value "measurement position left flank" is likewise performed.

As shown in FIG. 4, the measuring feeler 10, 11 is then placed against the right flank 13, where again at the rotational drive means 3, 4 the adjustment "contact right flank" and at the measured value emission means the adjustment "measured position right flank" are performed.

The test apparatus is thus balanced, using one tooth gap and positioning the feeler against the left and right flanks thereof, so that now in one test revolution the circumferential spacing can be tested; this is done in that via the incremental rotational drive means 3, 4, utilizing the number—which is after all known—of teeth of the test object, the individual measuring positions for an absolute testing of spacing can be predetermined. In this absolute spacing testing, a comparison of the position of the measuring feeler 10, 11 then takes place in each case with the aid of the zero positions explained in connection with FIGS. 2–4.

An example of this will now be described, referring to FIGS. 5a–h.

Figure 5A:
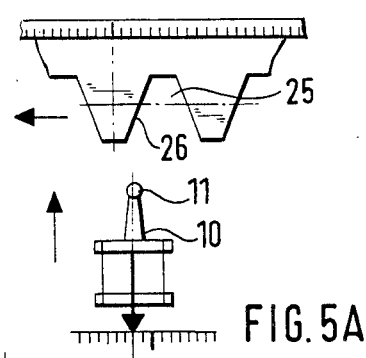
FIGS. 5a-h show the course of one measurement process.
Figure 5H:
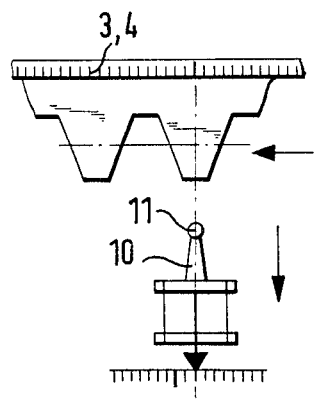
Figure 5B:
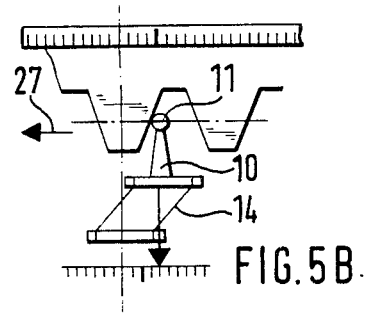
Figure 5G:
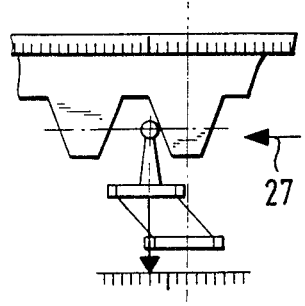
Figure 5C:
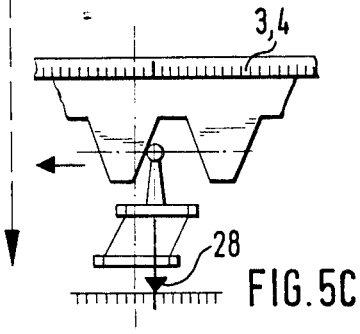

As shown in FIG. 5a, the measuring feeler 10, 11 is in the position where it is just now to be introduced into the tooth gap 25. There it moves into contact with the left tooth flank 26, along which it slides and assumes the position indicated by the stop 9 in FIG. 1. This position is shown in FIG. 5b, which at the same time also shows how the feeler 10, 11, with its parallogram spring arrangement 14, is deflected counter to the direction of rotation 27 of the gear. The advancement of the gear is now effected by the incremental rotational drive means 3, 4 up to the marking at which the zero balancing is effected as shown in FIG. 3. This is shown in FIG. 5c. At this instant, the emission of the measured value takes place, as indicated by the arrow 28.

Figure 5F:
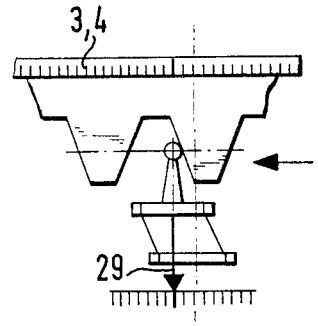
Figure 5D:
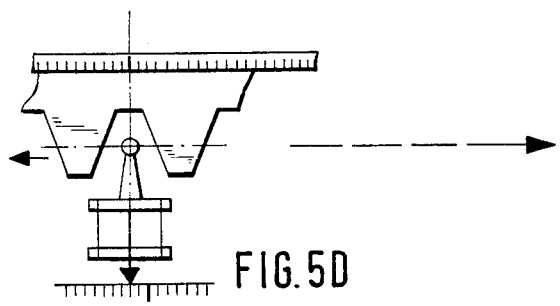
Figure 5E:
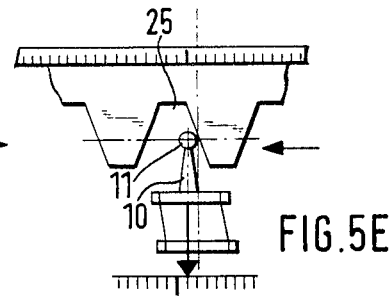

Subsequently the gear is moved further as shown in FIG. 5d, until the measuring feeler 10, 11 moves into contact as shown in FIG. 5e with the right flank of the tooth gap 25, with which it is moved into the position shown in FIG. 5f. Here, the measuring position at the incremental rotational drive means 3, 4 is attained as shown in FIG. 4, at which position the emission of that measured value takes place, as indicated by the arrow 29. Then the gear is moved further into the position shown in FIG. 5g, where the measuring feeler 10, 11 is then retracted from the tooth gap until it arrives in the position shown in FIG. 5g, after which the next measuring operation then begins again from the beginning as shown in FIG. 5a.

As a result of the course of the measurement operation shown in FIG. 5, the measuring feeler 10, 11 is brought slowly, or in other words gradually, into the respective measuring positions, so that recoiling either cannot occur or can subside before the measuring position is attained, without thereby having in any way to slow down the measuring speed or having to fear that errors in measurement caused by recoiling will occur.

In the measured value emission means 28 or 29, a comparison takes place in each case with the zero balance in accordance with FIGS. 3 and 4, and errors in circumferential spacing can thus be detected. With the same measured values detected in this manner, it is also possible, as described in U.S. Ser. No. 477,785, to detect deviations in concentricity, tooth thickness and tooth gaps, with appropriate computer processing.

In FIGS. 2-5, the gear wheels and incremental rotational drive means, or the measured value emission means, are shown as if they were parallel to one another. For the sake of simplification, this has been done as if the measurement operations were being performed on a gear rack instead of a gear wheel.

It will be understood that the measuring operations, particularly as shown in FIG. 5, can be performed in increments, depending upon conditions in individual cases; in other words, they can be performed equally well whether the test object is moved intermittently or continuously.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An improved automatic test apparatus for testing circumferential spacing as well as for detecting deviations in concentricity, tooth thickness and tooth gaps in gears, in which the gear is driven in one rotational direction for advancement from one measuring position to another, and in which a primary slide is substantially radially displaceable on an apparatus frame by a drive mechanism toward the gear and back away from said gear between adjustable stops, wherein positioning of the gear for the measurement operation is effected by means of a rotational drive means rotationally connected with the gear, further in which a feeler for successive detection of a measured value at right and left tooth flanks of a tooth gap in one measuring step during one revolution of the gear wheel is disposed on the primary slide, further including means for an automatic introduction of the feeler into a tooth gap to be measured and retraction back out of the tooth gap, and means for detection of the respective measured values, the improvement comprising said drive means providing continuous rotation of said gear at a constant speed, a spring means for guiding the measuring feeler parallel to itself for successive measurement of right and left tooth flanks of a tooth gap during rotation of said gear, the measuring feeler being positioned relative to the gear by rotation of the gear between a first measuring position on one tooth flank and a second measuring position on the other tooth flank of the tooth gap to be measured, actuation of the detecting means for pickup and emission of the measured values with respect to the right and left flanks of a tooth gap being effected by a switching position scale on said gear and a scanning head which detects preset switching detection positions on said scale corresponding to said first and second measuring positions which are arrived at in succession via rotation of the gear wheel, and the detection of the measured values being effected by the measuring feeler being disposed in contact with the right and left flanks successively of the tooth gap.

2. An improved automatic test apparatus as set forth in claim 1 wherein
said scale is fixed to said gear.

3. An improved automatic test apparatus as set forth in claim 1 wherein
said scanning head is fixed in a stationary position.

4. An improved automatic test apparatus as set forth in claim 2 wherein
said scanning head is fixed in a stationary position.

* * * * *